United States Patent [19]

Head

[11] Patent Number: 5,379,216
[45] Date of Patent: Jan. 3, 1995

[54] METHOD AND APPARATUS FOR PRODUCING A NEW OUTPUT RECORD MEDIUM ILLUSTRATING A QUANTITATIVE DESCRIPTION IN THE VOLUME DIMENSION OF MUD FILTRATE INVASION INTO PERMEABLE ZONES OF A FORMATION IN A WELLBORE

[75] Inventor: Elton L. Head, Kingwood, Tex.

[73] Assignee: Schlumberger Technology Corporation, Houston, Tex.

[21] Appl. No.: 889,545

[22] Filed: May 27, 1992

[51] Int. Cl.⁶ ............... G06F 15/20; G01V 5/00
[52] U.S. Cl. ............................ 364/422; 73/153
[58] Field of Search ............... 364/422; 73/152, 153

[56] References Cited

U.S. PATENT DOCUMENTS

| | | | |
|---|---|---|---|
| 4,353,248 | 10/1982 | Caldwell | 73/152 |
| 4,531,188 | 7/1985 | Poupon | 364/422 |
| 4,584,874 | 4/1986 | Ruhovets | 73/152 |
| 4,716,973 | 1/1988 | Cobern | 175/50 |
| 4,722,095 | 1/1988 | Muegge et al. | 378/4 |
| 4,949,575 | 8/1990 | Rasmus | 73/152 |
| 4,961,343 | 10/1990 | Boone | 73/152 |
| 4,964,101 | 10/1990 | Liu et al. | 367/31 |
| 5,184,508 | 2/1993 | Desbrandes | 73/152 |

Primary Examiner—Gail O. Hayes
Assistant Examiner—A. Bodendorf

[57] ABSTRACT

A volume transform system, which includes a computer processor and a novel volume transform software, receives a set of invasion parameters from a parameterization system, the parameterization system producing a set of invasion parameters which represent a resistivity profile of a formation traversed by a wellbore. The volume transform system functions to perform a quantitative invasion analysis on the invasion parameters in the volume dimension by computing the volume of mud filtrate (Vmf) for each unit of depth in the wellbore and producing a new output record medium, or a new log, which quantitatively illustrates the volume of the mud filtrate (vmf) invasion into the formation traversed by the wellbore as a function of depth in the wellbore. The aforementioned quantitative invasion analysis in the volume dimension compensates for variations in drilling mud, porosity, formation water, and saturation gradient from well to well and between hydrocarbon and water zones with a wellbore.

10 Claims, 6 Drawing Sheets

$Sxo = 1/\emptyset \sqrt{Rmf/Rxo}$ $\emptyset Sxo = \sqrt{Rmf/Rxo}$ $\int dV \rightarrow$ BARRELS/ft $\int dh \rightarrow$ BARRELS/ZONE

METHOD AND APPARATUS FOR PRODUCING A NEW OUTPUT RECORD MEDIUM ILLUSTRATING A QUANTITATIVE DESCRIPTION IN THE VOLUME DIMENSION OF MUD FILTRATE INVASION INTO PERMEABLE ZONES OF A FORMATION IN A WELLBORE

BACKGROUND OF THE INVENTION

The subject matter of the present invention relates to a system adapted to be disposed at the surface of a wellbore for determining mud filtrate volume data as a function of depth in a wellbore from a set of parameterized, processed, and wellbore corrected induction logging array signal data, which data is produced by an array induction tool disposed in the wellbore, and for generating an output record medium which reflects and illustrates the mud filtrate volume data in the form of a log, the log being analyzed in order to determine information regarding wellbore formation properties, such as layering, vertical permeability, and formation damage.

Figure 1A:
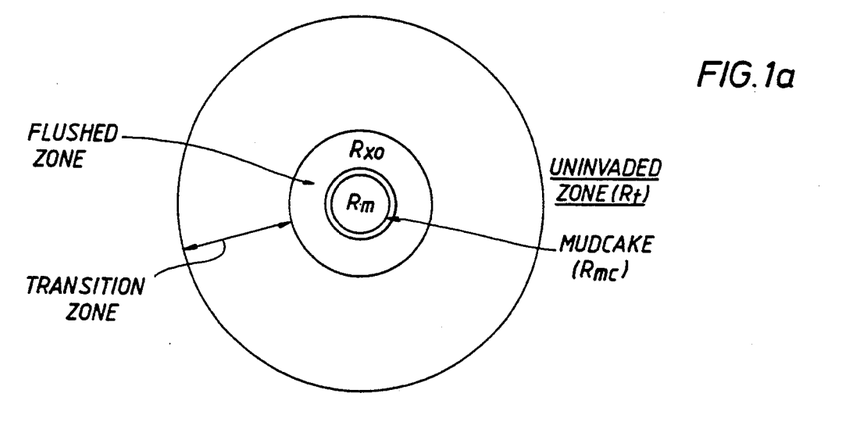
FIG. 1a illustrates a horizontal section through a permeable water bearing bed.
Figure 1B:
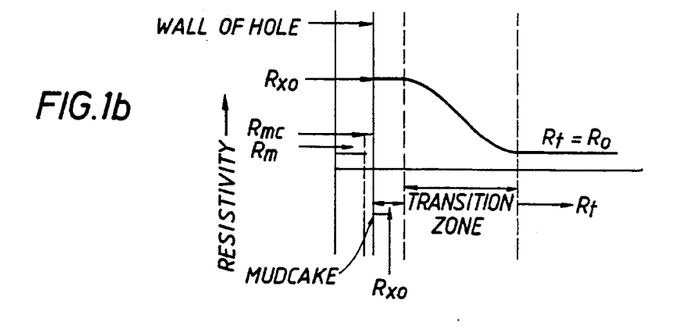
FIG. 1b illustrates a radial distribution of resistivities in the water bearing bed.
Figure 2A:
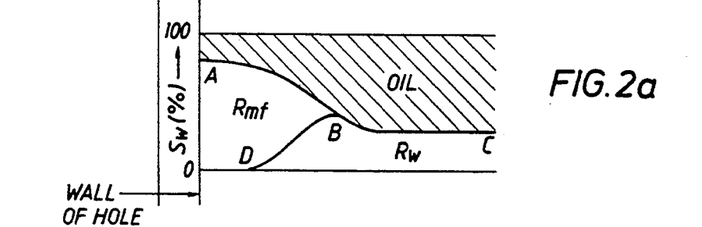
FIG. 2a illustrates a radial distribution of fluids in the vicinity of the borehole in an oil bearing bed.
Figure 2B:
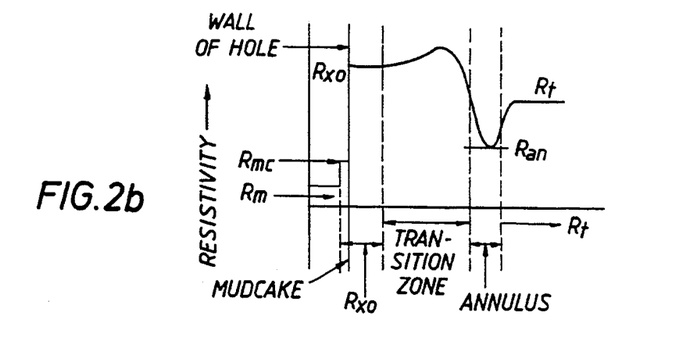
FIG. 2b illustrates a radial distribution of resistivities in the oil bearing bed.
Figure 3:
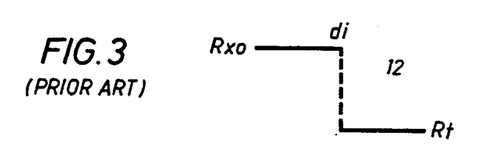
FIG. 3 illustrates a resistivity curve synthesized by a prior art well logging tool for a particular depth in a wellbore showing an abrupt step function to illustrate the resistivity of the formation in the vicinity of the transition zone.
Figure 4:
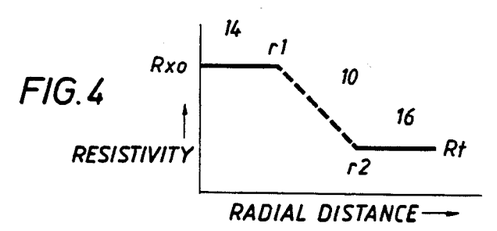
FIG. 4 illustrates a resistivity curve which shows a gradual transition of the resistivity of the formation in the vicinity of the transition zone disposed between the flushed zone and the uninvaded zone.
Figure 5A:
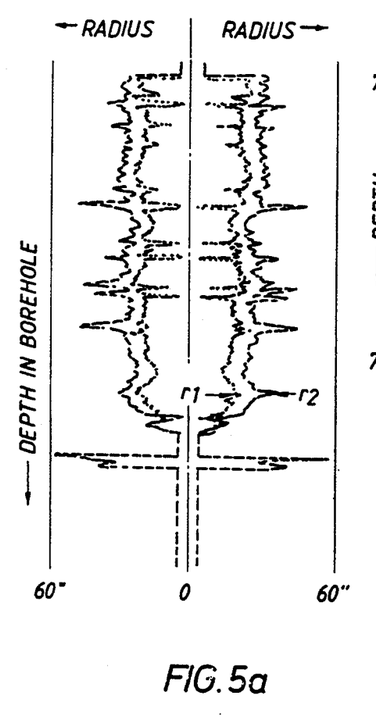
FIG. 5a illustrates a diagram of depth in a borehole versus radius, the diagram depicting the flushed zone, the transition zone and the uninvaded zone versus depth for a typical borehole.
Figure 5B:
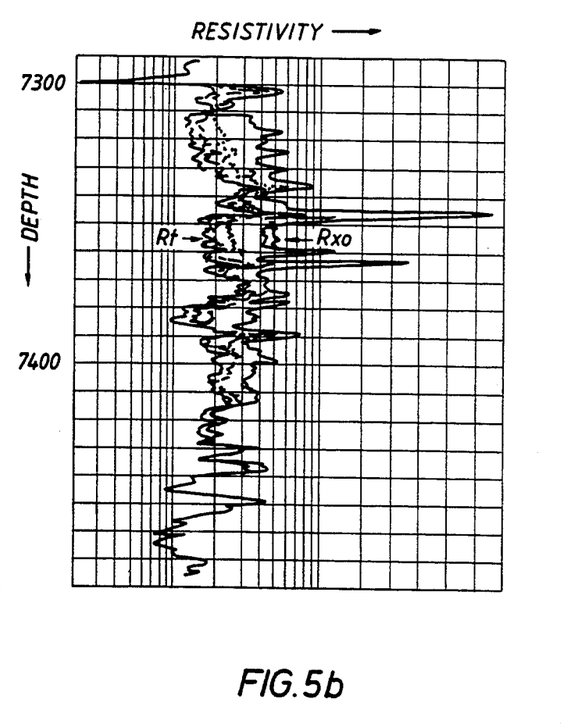
FIG. 5b illustrates a resistivity log or diagram of depth in a borehole versus resistivity.

During the drilling of a wellbore, mud pumps introduce mud into the well in order to flush rock chips and other unwanted debris out of the wellbore. The mud is introduced into the wellbore under pressure, the mud pressure being slightly greater than the pressure of a formation traversed by the wellbore thereby preventing a phenomenon known as well blowout. The resultant pressure differential between the mud column pressure and the formation pressure forces mud filtrate into the permeable formation, and solid particles of the mud are deposited on the wellbore wall forming a mudcake. The mudcake usually has a very low permeability and, once developed, considerably reduces the rate of further mud filtrate invasion into the wellbore wall. In a region very close to the wellbore wall, most of the original formation water and some of the hydrocarbons may be flushed away by the mud filtrate. This region is known as the "flushed zone", or the "invaded zone". If the flushing is complete, the flushed zone pore space contains only mud filtrate; in addition, if the flushed zone was originally hydrocarbon bearing, it would contain only residual hydrocarbons. Further out from the wellbore wall, the displacement of the formation fluids by the mud filtrate is less and less complete thereby resulting in a second region, this second region undergoing a transition from mud filtrate saturation to original formation water saturation. The second region is known as the "transition zone". The extent or depth of the flushed and transition zones depends on many parameters, among them being the type and characteristics of the drilling mud, the formation porosity, the formation permeability, the pressure differential, and the time since the formation was first drilled. The undisturbed formation beyond the transition zone is known as the "uninvaded, virgin, or uncontaminated zone". In FIGS. 1a–1b, a schematic representation of an invasion and resistivity profile in a water-bearing zone is illustrated. FIG. 1a illustrates a cross section of a wellbore showing the locations of the flushed zone, the transition zone, and the uninvaded zone extending radially from the wellbore wall. FIG. 1b illustrates a radial distribution of formation resistivity extending radially from the wellbore wall, into the flushed zone, into the transition zone, and into the uninvaded zone. In FIGS. 2a–2b, a schematic representation of an invasion and resistivity profile in an oil-bearing zone is illustrated. FIG. 2a illustrates the radial distribution of fluids in the vicinity of the wellbore, oil bearing bed. FIG. 2b illustrates the radial distribution of resistivities for an oil bearing zone, similar to the radial distribution of resistivities for a water bearing zone shown in FIG. 1b. Sometimes, in oil and gas bearing formations, where the mobility of the hydrocarbons is greater than that of the water, because of relative permeability differences, the oil or gas moves away faster than the interstitial water. In this case, there may be formed, between the flushed zone and the uninvaded zone, an "annular zone or annulus", shown in FIG. 2b, with a high formation water saturation. Annuli probably occur, to some degree, in most hydrocarbon bearing formations; and their influence on measurements depends on the radial location of the annulus and its severity. However, the existence of these zones (the flushed, transition, annular, and uninvaded zones) influence resistivity log measurements and therefore the accuracy of the resistivity log itself that is presented to a client. The resistivity log is utilized by the client to determine if oil exists in the formation traversed by the wellbore. The client is mainly interested in the true and correct value of Rt, the resistivity (reciprocal of conductivity) of the uninvaded zone, since Rt is the best measure of the possibility of oil existing in the formation. However, the existence of the flushed and transition zones in the formation adjacent the wellbore wall adversely affect a measurement of Rt. Therefore, since large amounts of money may be spent based on the resistivity log presented to the client, it is important to understand the true resistivity of the formation in the flushed and transition zones in order to improve the accuracy of the resistivity log in general. Prior art well logging tools function to log the formation and generate signals, which signals are processed by a well logging truck computer situated at the well surface. The well truck computer produces a resistivity log. For a particular depth in the wellbore, the shape of a resistivity radial profile (hereinafter, resistivity profile), produced by the prior art well tool at the particular depth and extending radially outward from a point at the wellbore wall, is shown in FIG. 3. In FIG. 3, the resistivity profile indicates a flushed zone resistivity "Rxo" an uninvaded zone (true) resistivity "Rt", and a transition zone resistivity represented by an abrupt step function indicated generally by the diameter of invasion symbol "di". This step function transition zone resistivity does not accurately reflect the true resistivity distribution of the transition zone in the wellbore; therefore, the value of the resistivity Rt of the uninvaded zone is also adversely affected. The resistivity of the transition zone does not change abruptly as shown in FIG. 3; rather, it changes gradually as shown in FIG. 1b. Therefore, the resistivity profile generated by the prior art well logging tool was at least partially inaccurate. To correct this deficiency, a new transition zone has been defined. In FIG. 4, a resistivity curve is plotted using a set of invasion parameters, that is, the flushed zone 14 resistivity is Rxo, the uninvaded zone 16 resistivity is Rt, and the transition zone 10 resistivity is a gradual decrease (or increase) from Rxo to Rt. The flushed zone 14 extends a radius r1 from the borehole wall radially into the formation; the uninvaded zone 16 begins at a radius r2 from the borehole wall and extends into the formation. Therefore, the transition zone 10 lies within a region defined between radii r2 and r1. In FIG. 4, the transition zone resistivity changes gradually from Rxo to Rt, and not abruptly as shown in FIG. 3. A true and accurate reading of Rt must be obtained to determine if oil exists in the formation traversed by the borehole. In FIG. 5a, a diagram of depth in a borehole versus radius is illustrated, the diagram depicting the radial extension of the flushed zone, the transition zone, and the uninvaded zone over a plurality of depths in a borehole. For example, in FIG. 5a, the flushed zone extends from the borehole wall to radius r1; the transition zone extends from radius r1 to radius r2, and the uninvaded zone extends from radius r2 radially outward into the formation. Notice that there is a distinct difference between radius r2 and radius r1, indicating that the radial width of the transition zone is more than an abrupt step function, as in FIG. 3. In FIG. 5b, a resistivity log or diagram of depth in a borehole versus resistivity is illustrated. In this example, the lowest reading of resistivity is the uninvaded zone resistivity Rt (the conductivity is the highest). The highest reading of resistivity, relative to the other zones, is the flushed zone resistivity Rxo (the conductivity is the lowest). A complete description of the method and apparatus for deriving the invasion parameters useful for defining the transition zone of FIG. 4 is filed Apr. 16, 1991, entitled "Method and Apparatus for Determining Parameters of a Transition Zone of a Formation traversed by a Wellbore and Generating a More Accurate Output Record Medium", the disclosure of which is incorporated by reference into this specification.

Mud filtrate invasion analysis from resistivity logs is commonly attempted by qualitative inspection of the separation between measurement displays representing different depths of investigation. However, general comparisons cannot be based exclusively on radial resistivity differences. As described above, an improvement can be obtained by performing an inversion of resistivity differences through an assumed model to yield a parameter dimensioned in length, and FIG. 4 illustrates a model for a radial resistivity profile originating at the wellbore, incorporating a transition zone between undisturbed rock and rock flushed by drilling fluid invasion. The resulting invasion description in length units may adequately describe invasion in water zones, but may not adequately describe invasion in hydrocarbon zones which are the principle zones of interest. A number of variables should be taken into account. For example, hydrocarbon zones are more complicated because depth based variation in the saturation gradient through the flushed zone/undisturbed zone interface may be confused with changes in invasion character. In addition, variations in drilling mud properties between wells will change the radial resistivity profile, as will differences in formation water properties. Furthermore, depth variation in porosity and hydrocarbon saturation must also be taken into account. Therefore, unless these variables are taken into consideration, an interpretation of the resistivity profile could be wrong.

To solve this problem, invasion analysis should be performed in the volume domain in accordance with the present invention. This volume domain mud filtrate invasion analysis normalizes the effect of all these variables and is useful for comparing well to well and between zones within a well for both water and hydrocarbon zones of interest.

SUMMARY OF THE INVENTION

Accordingly, it is a primary object of the present invention to provide a new output record medium, a new log, adapted to be presented to a client for ultimately determining the presence of hydrocarbon bearing formations in a wellbore, the new log reflecting and illustrating a quantitative description, in the volume dimension, of mud filtrate invasion into permeable zones of a formation during drilling of a wellbore.

It is a further object of the present invention to provide a quantitative description of mud filtrate invasion into permeable zones of a wellbore under conditions where, during drilling, the wellbore pressure exceeds reservoir pressure, such quantitative description being provided in the volume dimension.

It is a further object of the present invention to provide a method and apparatus for determining mud filtrate volume for each depth sample of continuously recorded well logs, the determination of mud filtrate volume utilizing parameterized differences between resistivity logs with progressive depths of investigation.

In accordance with these and other objects of the present invention, an induction logging tool is disposed in a wellbore, the induction logging tool transmitting an electric field into a formation traversed by the wellbore in response to an alternating current in a transmitting coil, the electric field inducing eddy currents in the formation. The electric field generated by the eddy currents induces, in a receiving coil of the induction tool, an electromotive force which produces a received electrical signal in the receiving coil. The received electrical signal comprises twenty-eight (28) array signals, which signals are transmitted uphole to a computer situated in a well logging truck. The computer includes a memory in which a set of software is stored. The set of software includes a borehole correction software, a signal processing software, a parameterization software, and a volume transform software, the volume transform software in association with the processor of the computer being the subject matter of the present invention. The computer receives the signals from the well logging tool and responds by executing its borehole correction software thereby borehole correcting the signals to take into account the effects of the borehole; then, the borehole corrected signals are processed by the computer in conjunction with its signal processing software, the borehole corrected signals, which are comprised of a plurality of multi-frequency signals, being separated into their in-phase and quadrature components, the in-phase and quadrature components of each of the multi-frequency signals being combined to produce an output signal characteristic of the formation traversed by the borehole; then, the borehole corrected and processed output signal is parameterized by the computer in conjunction with its parameterization software, the borehole corrected and processed output signal being reduced to a set of invasion parameters which describe or illustrate the conductivity or resistivity of the flushed zone, the uninvaded zone, and transition zone of the formation traversed by the wellbore; and finally, the invasion parameters undergo volume transformation by the computer in conjunction with the volume transform software, the invasion parameters being used to produce a new output record medium, or a new log, which quantitatively illustrates the volume of the mud filtrate invasion of the formation traversed by the borehole as a function of depth in the borehole. The aforementioned quantitative invasion analysis in the volume dimension compensates for variations in drilling mud, porosity, formation water, and saturation gradient from well to well and between hydrocarbon and water zones with a wellbore. The volume of mud filtrate invasion of the formation per unit of depth in the wellbore is described by the following equation:

$$V_{mf} = 3.1416\ldots/3[(R_{mf}/R_{xo})^{1/n}][r_1^2 + (r_1)(r_2) + r_2^2 - 3r_b^2],$$

where Rmf is the resistivity of the mud filtrate; Rxo, $r_1$, $r_2$ form a part of the invasion parameters; and $r_b$ is the radius of the borehole.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DESCRIPTION OF THE PREFERRED EMBODIMENT

Figure 13:
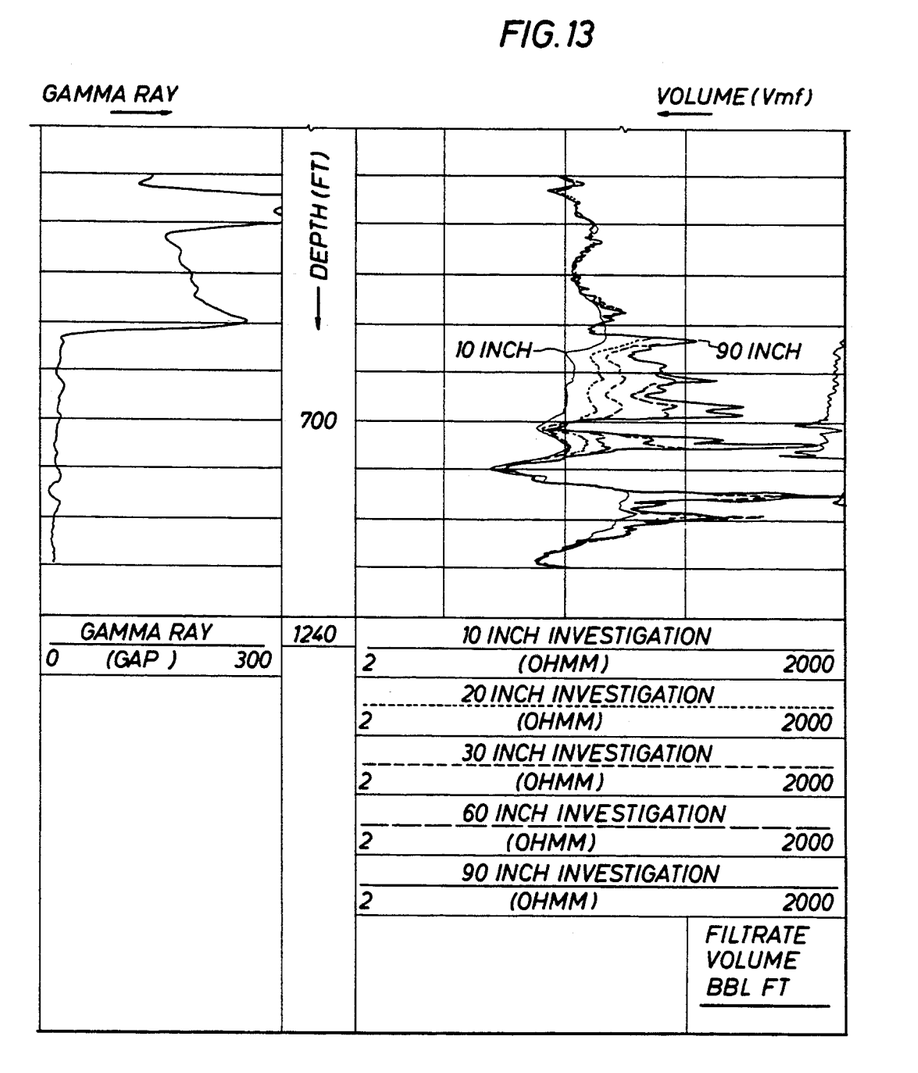
FIG. 13 illustrates the new output record medium, a new log, which may be given to a client for determining the presence or absence of hydrocarbon bearing formations in a wellbore, the new log illustrating mud filtrate volume data as a function of depth in the wellbore, the volume data being computed from a set of data which originate from an induction logging tool disposed in the wellbore.

Referring initially to FIG. 13, a major objective of the present invention is to produce a new output record medium, a new log, which may be given to a client and which may assist the client in the ultimate determination of the presence or absence of hydrocarbon bearing formations in a wellbore. The new log of FIG. 13 represents the volume of mud filtrate invading an earth formation as a function of depth in the wellbore. As previously mentioned, when drilling a wellbore, permeable zones are invaded by mud filtrate from the drilling fluid under normal conditions where wellbore pressure exceeds reservoir pressure. It is desirable to quantitatively describe the mud filtrate invasion into a reservoir. Well logs are used to present this quantitative description. A quantitative description of mud filtrate invasion would assist planning and analysis of well tests and can be used to monitor alteration of the rock formation near the wellbore. In addition, correlations also exist between the response of a reservoir during drilling and subsequent production after the well is completed. However, in order to compare hydrocarbon zones to water zones within a well and also allow well-to-well comparisons, such a quantitative description must be done in the volume dimension. The following discussion represents a method for determining mud filtrate volume for each depth sample, in a wellbore, of continuously recorded well logs. This mud filtrate volume determination makes full use of certain parameterized differences which exist between resistivity logs having progressive depths of investigation.

Figure 6:
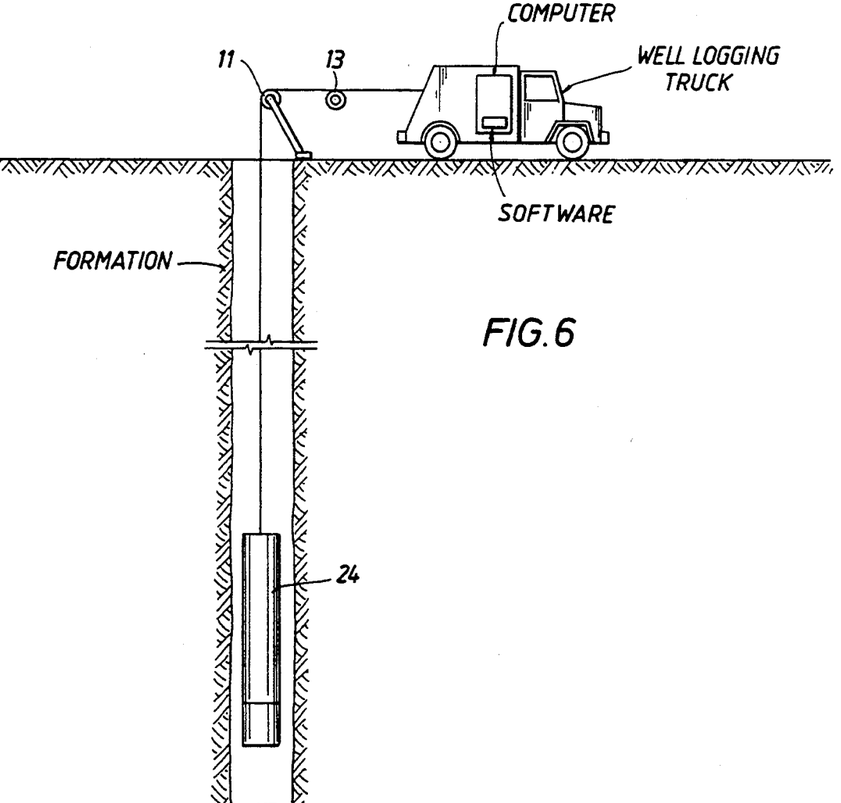
FIG. 6 illustrates a system including a well tool, such as an induction logging tool, adapted to be disposed in the wellbore and a computer situated in a well logging truck at the surface of the wellbore which is electrically connected to the well tool disposed in the borehole for generating the new output record medium of the present invention depicting the volume of mud filtrate per unit of depth in response to the array signals transmitted uphole from the well tool.

Referring to FIG. 6, a system is illustrated. The system includes a well tool 24, such as an induction logging tool, adapted to be suspended in a wellbore by a wireline cable for generating a plurality of array signals; and a computer situated in a well logging truck at the surface of the wellbore.

The well tool 24 may be an induction logging tool. The induction tool comprises at least one transmitting coil and at least one receiving coil mounted on a support and axially spaced along the borehole. The transmitting coil is energized by an alternating current and generates an electric field which induces in the formation surrounding the borehole eddy currents which are proportional to the conductivity of the formation. The field generated, in turn, by these eddy currents induces in the receiving coil an electromotive force, which force produces a received signal in the receiving coil. By suitably processing this signal, a measurement of formation conductivity is obtained. In a system comprising a plurality of receiving coils, the signals from the plurality of receiving coils collect information about the conductivity of the formation at different depths into the formation. For more information about this induction logging tool, refer to U.S. Pat. No. 5,157,605 to Chandler et al corresponding to prior pending application Ser. No. 07/043,130, filed Apr. 27, 1987, entitled "Induction Logging Method and Apparatus including Means for Combining In-Phase and Quadrature Components of Signals received at Varying Frequencies and including Use of Multiple Receiver Means associated with a Single Transmitter", the disclosure of which is incorporated by reference into this specification.

This detailed knowledge of the radial conductivity character of the formation may be parameterized using a particular model to produce a description of the mud filtrate invasion into the formation in units of length (not volume). For more information about this particular model, refer to prior pending application Ser. No. 07/686,099, filed Apr. 16, 1991, entitled "Method and Apparatus for Determining Parameters of a Transition Zone of a Formation traversed by a Wellbore and Generating a More Accurate Output Record Medium", the disclosure of which has already been incorporated by reference into this specification. However, as previously noted, in order to utilize this invasion description quantitatively for general cases, the description must be accomplished in units of volume (not length) in accordance with the present invention.

The well logging truck computer of FIG. 6 stores a special set of software instructions therein which will be discussed in more detail later in this specification. The computer is electrically connected, via the wireline, to the well tool 24 and generates the new output record medium of FIG. 13 when the computer executes the stored special set of software instructions in response to the receipt by the computer of the array signals transmitted uphole from the well tool 24.

Figure 7:
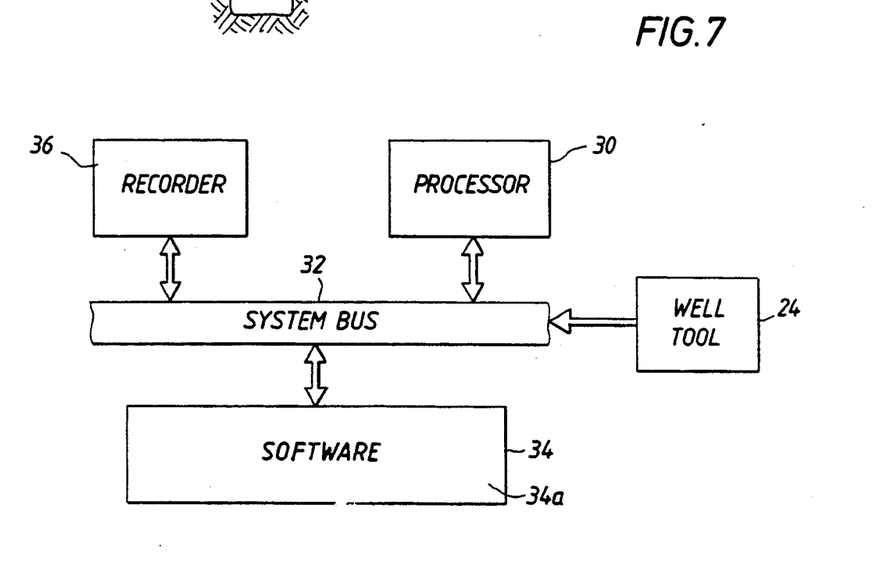
FIG. 7 illustrates a further more detailed construction of the computer disposed in the well logging truck of FIG. 6, the computer including a memory having a software disposed therein.

Referring to FIG. 7, a more detailed construction of the computer disposed in the well logging truck of FIG. 6 is illustrated. The computer includes a processor 30 connected to a system bus 32, a color graphics recorder 36 connected to the system bus 32, and a memory 34 connected to the system bus 32, the memory 34 storing a special set of software instructions 34a therein, the software instructions 34a including a volume transform software in accordance with the present invention. When the processor 30 executes the volume transform software (part of the software instructions 34a of FIG. 7), the new output record medium, the new log, of FIG. 13 is generated. The log of FIG. 13 is new simply because the prior art is devoid of any log or other output record medium which illustrates mud filtrate volume per unit of depth in the wellbore.

The computer of FIGS. 6 and 7 may be one of the following computer systems manufactured by Digital Equipment Corporation (DEC) of Maynard, Mass.: (1) DEC VAX 6430, (2) DEC PDP-11, or (3) DEC Vaxstation 3100.

Figure 8:
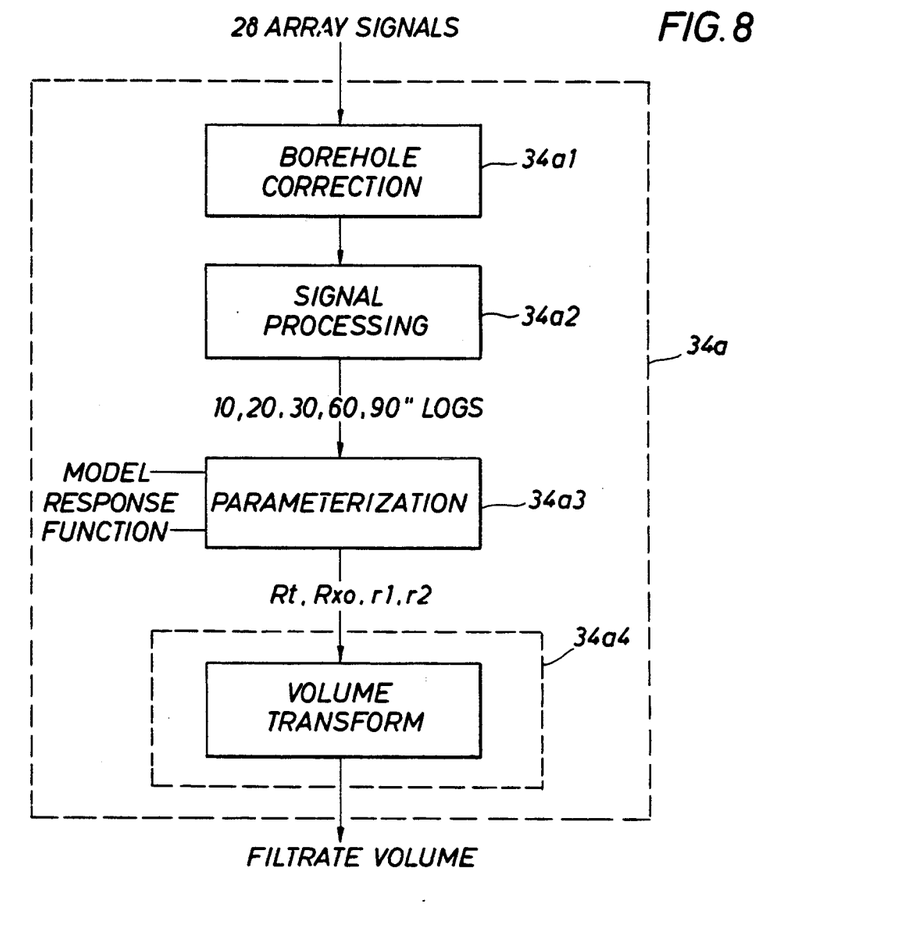
FIG. 8 illustrates a block diagram of the software disposed in the memory of FIG. 7, the software including the volume transform software in accordance with the present invention.
Figure 9A:
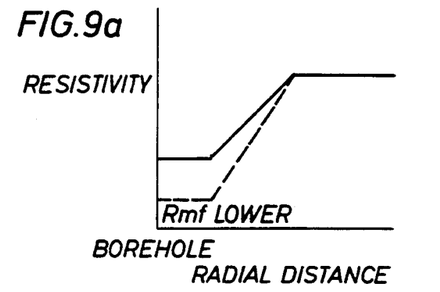
FIGS. 9a through 9f illustrates the effects which different variables have on the resistivity profile of FIG. 4, these variables including variations in drilling mud properties between wells, differences in formation water between zones, and depth variation in porosity and hydrocarbon saturation.
Figure 9B:
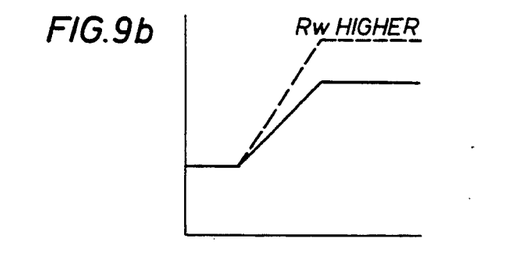
Figure 9C:
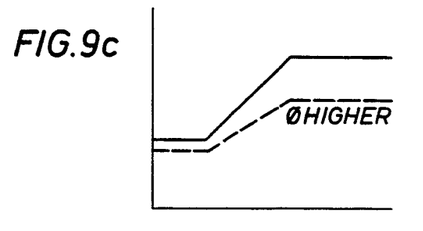
Figure 9D:
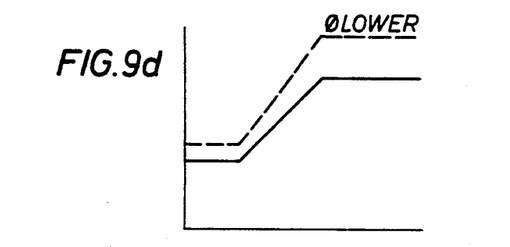
Figure 9E:
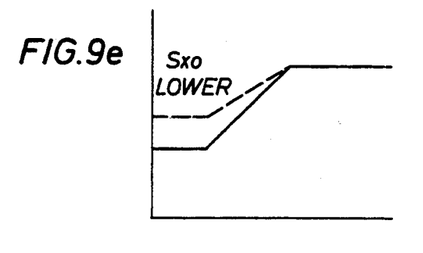
Figure 9F:
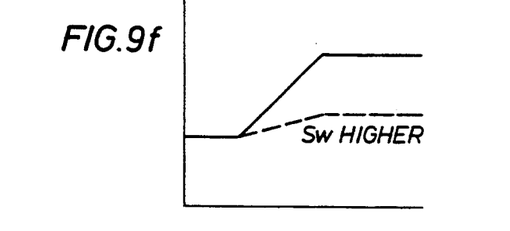

Referring to FIG. 8, a block diagram of the software instructions 34a stored in memory 34 of FIG. 7 is illustrated. In FIG. 8, the signal transmitted uphole from the well tool 24 of FIG. 6 to the computer situated in the well logging truck at the wellbore surface comprise a set of 28 array signals. When the computer receives the array signals from the well tool 24, the processor 30 begins executing the software instructions 34a stored in memory 34. In FIG. 8, the software instructions 34a comprise four basic software blocks: a borehole correction software 34a1, a signal processing software 34a2, a parameterization software 34a3, and a volume transform software 34a4 in accordance with the present invention. Each of these four basic software blocks will be discussed below.

The borehole correction software 34a1 is fully disclosed in U.S. Pat. No. 5,041,975 to Minerbo et al, issued Aug. 20, 1991, entitled "Borehole Correction System for an Array Induction Well Logging Apparatus", assigned to the same assignee as that of the present invention, the disclosure of which is incorporated by reference into this specification. This borehole correction software 34a1, in conjunction with the well logging truck computer, obtains an accurate measurement of the true conductivity of a formation in a borehole by subtracting a correction term (which is a function of mud conductivity, borehole radius, standoff distance, and an estimated value of the formation conductivity) from certain raw data (the raw data being the array signals received by the computer from a receiver of the well tool 24) thereby producing a set of eighteen complex output voltages which represent signals that would have been recorded from the receiver of the well tool 24 had there been no borehole.

The signal processing software 34a2 is fully disclosed in U.S. Pat. No. 5,157,605 to Chandler et al corresponding to prior pending application Ser. No. 07/043,130, filed Apr. 27, 1987, entitled "Induction Logging Method and Apparatus including Means for Combining In-Phase and Quadrature Components of Signals received at Varying Frequencies and including Use of Multiple Receiver Means associated with a Single Transmitter", assigned to the same assignee at that of the present invention, the disclosure of which has already been incorporated by reference into this specification. In general, however, the signal processing software 34a2, as described in the above referenced Chandler patent, acquires both the in-phase and quadrature components of each receiver array signal, at several frequencies, transmitted from a plurality of receiver arrays inherent in the well tool 24, and a response function is shaped by using a multi channel deconvolution filter. The basic equation of multi-channel deconvolution, as set forth in the prior pending application Ser. No. 07/043,130 to Chandler et al already incorporated herein by reference, is:

$$\sigma_d(z) = \sum_{n=1}^{N} \sum_{z'=z_{nmin}}^{z_{nmax}} \sigma_n(z - z') a_n(z') \quad (A)$$

where the subscript n refers to the channel number and $\sigma_n(z)$ is the conductivity measured by the nth array at position z. The summation goes from channel 1 to channel N and from $z_{nmin}$ to $z_{nmax}$, the minimum and maximum log interval depth for each channel. The a's are the filter coefficients. This equation implies that the signal from a set of N arrays will be obtained at a number of positions and will be weighted and added to obtain a log value. The values of the filter coefficients (the a's) as well as the choice of independent arrays will determine the tool response. Because the arrays have a response which can be written in the form of the equation above, the total response of the multichannel sonde can be written in the same general form:

$$\sigma_d(z) = \int_{-\infty}^{\infty} dz' \int_{-\infty}^{\infty} d\rho \, g_d(\rho, z - z') \sigma(\rho, z') \quad (B)$$

where $$g_d(\rho, z) = \sum_{n=1}^{N} \sum_{z'=z_{nmin}}^{z_{nmax}} g_n(\rho, z - z') a_n(z') \quad (C)$$

To be more specific, the signal processing software 34a2 processes the in-phase and quadrature components of each receiver array signal into an output signal representative of the characteristic of a formation traversed by a borehole. The signal processing software 34a2 processes the in-phase and quadrature components of each receiver array signal, not only at several different frequencies, but also at several different vertical depths in the borehole, in accordance with the above multichannel deconvolution equation, to produce the output signal representative of the characteristic of the formation.

The parameterization software 34a3 is fully disclosed in prior pending application Ser. No. 07/686,099, filed Apr. 16, 1991, entitled "Method and Apparatus for Determining Parameters of a Transition Zone of a Formation traversed by a Wellbore and Generating a More Accurate Output Record Medium", assigned to the same assignee at that of the present invention, the disclosure of which has already been incorporated by reference into this specification. In general, however, the parameterization software 34a3 receives the "sigma$_d$(z)" tightly focused response from the signal processing software 34a2 and generates a set of invasion parameters: Rxo, w, N, and Rt; where Rxo is the resistivity of the invaded zone, Rt is the true resistivity of the uninvaded zone, and w and N are parameters related to the resistivity of the transition zone, where w is the midpoint of the resistivity curve in the transition zone, and N is related to the slope of the resistivity curve in the transition zone. These invasion parameters enable one to plot a resistivity radial profile for the invaded zone, the uninvaded zone, and the transition zone as a function of depth in the wellbore, the transition zone being interposed between the invaded zone and the uninvaded zone of the formation traversed by the borehole. The resistivity radial profile for the transition zone is a gradual one, not abrupt in nature; therefore, the resistivity radial profile is more accurate in terms of its reflection of the actual resistivity of the formation traversed by the borehole. If one knows Rxo, the resistivity of the invaded zone, and Rt, the resistivity of the uninvaded zone, one must also know two more parameters to plot the resistivity radial profile for the transition zone: w, the midpoint of the transition zone, and N, a value related to the slope of the resistivity radial profile between Rxo and Rt. If w and N are known, then, the radii r1 and r2, defined with reference to FIG. 4, are also known. As a result, the following four parameters are output from the parameterization block 34a3 for each unit of depth in the wellbore as a result of execution by processor 30 of the parameterization software 34a3: Rt, Rxo, r1 and r2. Using the parameters (Rt, Rxo, r1, r2) for each unit of depth, resistivity logs are generated. FIGS. 5a and 5b illustrate such resistivity logs. In FIGS. 5a-5b, a plurality of resistivity radial profiles, one for each unit of depth in the wellbore, are illustrated, each resistivity radial profile being directed from the wellbore wall radially into the wellbore, each resistivity radial profile showing an invaded zone, a transition zone, and an uninvaded zone, each transition zone being gradual and not abrupt consistent with the profile shown in FIG. 4.

The volume transform software 34a4, in accordance with the present invention, receives a plurality of the parameters Rt, Rxo, r1, r2, one for each unit of depth in the wellbore, and, following execution of the parameterization software block 34a3, ultimately generates a corresponding plurality of volume data, one for each unit of depth in the wellbore. The volume data is representative of the volume of mud filtrate (Vmf) invading the formation traversed by the wellbore for each unit of depth in the wellbore. As shown in FIG. 13, a new output record medium, i.e., a new log, is generated which illustrates the volume of mud filtrate (Vmf) for each unit of depth in the wellbore. The new log is given to a client for his ultimate determination of the presence or absence of hydrocarbon bearing formations in the wellbore.

Referring to FIGS. 9a-13, a detailed discussion of the volume transform software 34a4 in accordance with the present invention is set forth in the following paragraphs with reference to FIGS. 9a-13 of the drawings.

Invasion analysis from resistivity logs is commonly attempted by qualitative inspection of the separation between measurement displays representing different depths of investigation. However, general comparisons cannot be based exclusively on radial resistivity differences. An improvement can be obtained by performing an inversion of resistivity differences through an assumed model to yield a parameter dimensioned in length. FIG. 4 illustrates a model for a radial resistivity profile originating at the wellbore, incorporating a transition zone between undisturbed rock and rock flushed by drilling fluid invasion. The resulting invasion description in length units may adequately describe invasion in water zones, but may not adequately describe invasion in hydrocarbon zones which are the principle zones of interest. A number of variables should be taken into account. For example, hydrocarbon zones are more complicated because depth based variation in the saturation gradient through the flushed zone/undisturbed zone interface may be confused with changes in invasion character. In addition, variations in drilling mud properties between wells will change the radial resistivity profile, as will differences in formation water zones. Furthermore, depth variation in porosity and hydrocarbon saturation must also be taken into account. FIGS. 9a-9f summarize the effects which these variables may produce on a resistivity profile. Therefore, unless these variables are taken into consideration, an interpretation of the resistivity profile could be wrong. To solve this problem, invasion analysis in the volume domain, in accordance with the present invention, normalizes the effect of all these variables and is useful for comparing well to well and between zones within a well for both water and hydrocarbon zones of interest.

Figure 10:
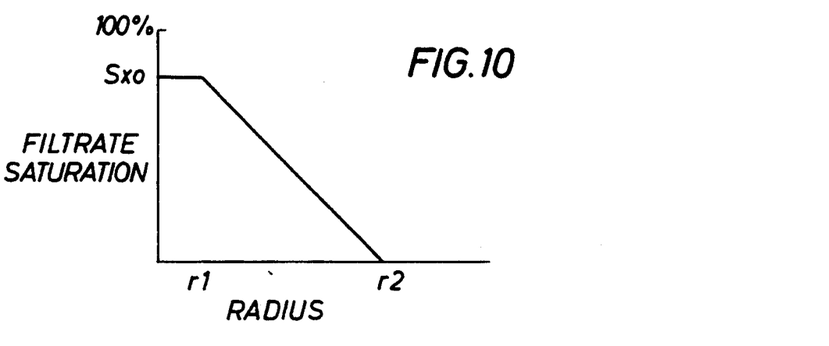
FIG. 10 illustrates a mud filtrate saturation profile similar to the resistivity profile of FIG. 4.

Referring to FIG. 10, a filtrate saturation profile can be constructed for each depth unit in a wellbore. For each depth unit, beyond the radial point r2, representing the limit of invasion, mud filtrate saturation is by definition zero. For the same depth unit, near the wellbore, mud filtrate saturation is by definition Sxo. Until a more appropriate function is established, mud filtrate saturation between radii r1 and r2 at said each depth unit is described by a straight line.

Figure 11:
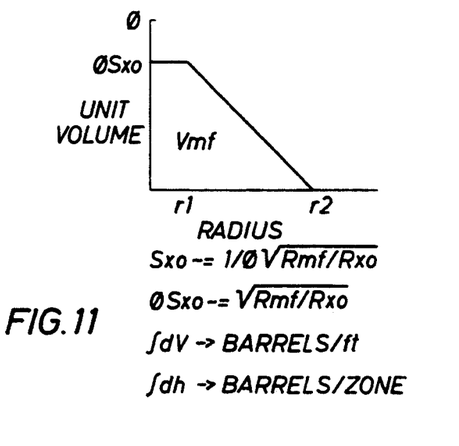
FIG. 11 illustrates the filtrate saturation profile of FIG. 10 converted to unit volume for a given depth sample by multiplying by porosity.

Referring to FIG. 11, the filtrate saturation profile of FIG. 10 may be converted to unit volume for each depth unit by multiplying the saturation (Sxo) by porosity (phi). It is presumed that the porosity is radially constant. Therefore, the mud filtrate volume (Vmf) profile for a unit of thickness at each depth unit of a formation in a wellbore is equivalent to the area under the curve in FIG. 11. However, since the area under the curve is the integral of the curve function, and since the curve function in FIG. 11 is the mud filtrate saturation (Sxo) multiplied by porosity (phi), presuming a circular invasion front because tool response represents azimuthal averaging, the volume of mud filtrate, Vmf, for a unit of thickness at each depth unit in the wellbore is the integral of (phi)Smf dV, and is represented by the following equation:

$$Vmf = \text{integral } (phi)Smf\, dV \quad (1)$$

where "Vmf" is the volume of mud filtrate for a unit of thickness at each depth unit in the wellbore, "phi" is the porosity of the formation presumed to be radially constant at the unit of thickness for each depth unit, and "Smf" is the mud filtrate saturation. Note that Smf=Sxo at radius=0 and Smf=0 at radius=r2 (FIG. 10) measured radially into the formation at the unit of thickness for each depth unit in the wellbore.

Figure 12:
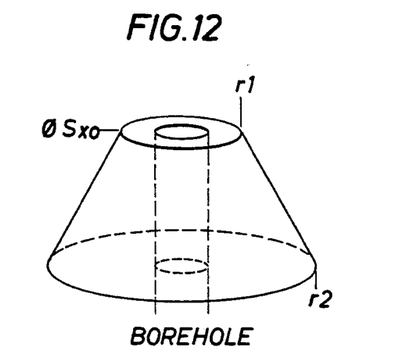
FIG. 12 illustrates a truncated cone, the geometrical shape of the volume representing mud filtrate invasion of a formation traversed by the wellbore for a given depth sample.

Referring to FIG. 12, with the origin at the center of the borehole, the integration is performed from the wellbore face to r2. The geometrical shape of the volume representing mud filtrate invasion into the unit of thickness for each depth unit in the wellbore is similar to that of a truncated cone, shown in FIG. 12. A form of Archie's formula, commonly used for petrophysical interpretation, may be written for the invaded zone at said unit of thickness for each depth unit in the wellbore as follows, where Rf=formation resistivity:

$$Smf = phi^{-1}(Rmf/Rf)^{1/n}, \quad (2)$$

where "phi" is the porosity at the unit of thickness at each depth in the wellbore, "Rmf" is the resistivity of the mud filtrate, and "Rf" is the formation resistivity.

Substituting equation (2) into equation (1), porosity "phi" is cancelled in the unit volume domain, leaving equation (1) in the following form:

$$Vmf = \text{integral } (Rmf/Rf)^{1/n} dV \quad (3)$$

By performing the integration of equation (3), the following equation (4) is produced which defines the relationship between the volume of mud filtrate (Vmf) for a given thickness per unit of depth in the wellbore as a function of the invasion parameters (Rxo, r1, r2), the resistivity of the mud filtrate (Rmf) and the radius of the wellbore ($r_b$):

$$Vmf = 3.1416\ldots /3[(Rmf/Rxo)^{1/n}][r_1^2 + (r_1)(r_2) + r_2^2 - 3r_b^2], \quad (4)$$

where the number 3.1416 . . . is the numerical element "pi". The volume of mud filtrate Vmf is the output of the parameterization software 34a3 of FIG. 8 for a given thickness at each unit of depth in the wellbore. Since the invasion parameters (Rxo, r1, r2) are known (output of parameterization software block 34a3 of FIG. 8), $r_b$ is known (the radius of the borehole), and Rmf is known (resistivity of mud filtrate), equation (4) is used by the well logging truck computer of FIG. 6 to compute the volume of mud filtrate (Vmf) (for a given thickness of formation) for each unit of depth in the wellbore.

In operation, referring to FIGS. 6, 7, 8, and 13, the well logging truck computer of FIG. 6 executes the software 34a of FIGS. 7 and 8. During the execution, the processor 30 first executes the borehole correction software 34a1 in the manner described in U.S. Pat. No. 5,041,975 to Minerbo et al, issued Aug. 20, 1991, entitled "Borehole Correction System for an Array Induction Well Logging Apparatus" assigned to the same assignee as that of the present invention, the disclosure of which is incorporated by reference into this specification. Then, the processor 30 executes the signal processing software 34a2 in the manner described in U.S. Pat. No. 5,157,605 to Chandler et al corresponding to prior pending application Ser. No. 07/043,130, filed Apr. 27, 1987, entitled "Induction Logging Method and Apparatus including Means for Combining In-Phase and Quadrature Components of Signals received at Varying Frequencies and including Use of Multiple Receiver Means associated with a Single Transmitter", assigned to the same assignee at that of the present invention, the disclosure of which has already been incorporated by reference into this specification. Then, the processor 30 executes the parameterization software 34a3 in the manner described in prior pending application Ser. No. 07/686,099, filed Apr. 16, 1991, entitled "Method and Apparatus for Determining Parameters of a Transition Zone of a Formation traversed by a Wellbore and Generating a More Accurate Output Record Medium", assigned to the same assignee at that of the present invention, the disclosure of which has already been incorporated by reference into this specification, and generates a set of invasion parameters (Rxo, $r_1$, $r_2$). Finally, the processor 30 executes the volume transform software 34a4; during this execution, the processor 30 receives the invasion parameters (Rxo, $r_1$, $r_2$) from the parameterization block 34a3, and, knowing the resistivity of the mud filtrate (Rmf) and the radius of the borehole $r_b$, using equation (4), processor 30 calculates the volume of mud filtrate (Vmf) for each unit of depth (having a given thickness) in the wellbore and instructs the recorder 36 of FIG. 7 to plot a new output record medium, a new log, which new log is shown in FIG. 13 of the drawings. Inspection of the mud filtrate volume of FIG. 13 can yield information about reservoir properties such as layering, vertical permeability, formation damage, and estimation of the amount of filtrate which would be produced during a well test before a representative sample of formation fluid was obtained. Derivation of this information from resistivity measurements with progressive depths of investigation is the novel contribution of the volume transform system (the volume transform software 34a4 in conjunction with the well truck computer) of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system responsive to a set of invasion parameters associated with each unit of depth in a wellbore for generating an output record medium, comprising:

first means responsive to the set of invasion parameters associated with said each unit of depth in said wellbore for determining a corresponding volume of mud filtrate which has invaded into permeable zones of a formation traversed by said wellbore for a given thickness at said each unit of depth in said wellbore, said permeable zones of formation at said each depth in said wellbore including a flushed zone, an uninvaded zone, and a transition zone interposed between said flushed zone and said uninvaded zoned, said invasion parameters including a resistivity of the flushed zone (Rxo), a radius ($r_1$) measured from a wall of said wellbore to an outer radial extremity of said flushed zone, and a radius ($r_2$) measured from a wall of said wellbore to an inner radial extremity of said uninvaded zone, said first means determining said volume of mud filtrate invasion into said flushed zone and said transition zone of said formation for a given thickness at said each unit of depth in said wellbore by using the following equation:

$$Vmf = 3.1416\ldots/3[(Rmf/Rxo)^{1/n}][r_1^2 + (r_1)(r_2) + r_2^2 - 3r_b^2],$$

where Vmf is the volume of mud filtrate, Rmf is the resistivity of said mud filtrate, and $r_b$ is the radius of said wellbore; and output record generating means responsive to the volume of mud filtrate invasion into said permeable zones of said formation for said given thickness at said each unit of depth in said wellbore determined by said first means for generating an output record medium illustrating said volume of mud filtrate invasion into said permeable zones of said formation at said each unit of depth in the wellbore.

2. The system of claim 1, wherein said output record generating means generates said output record medium, said output record medium illustrating said volume of mud filtrate invasion "Vmf" for a given thickness at said each unit of depth in said wellbore in response to the determination of said volume of mud filtrate invasion Vmf into said flushed zone and said transition zone by said first means.

3. A method of generating an output record medium illustrating a characteristic of a formation traversed by a wellbore, said formation having permeable zones, comprising the steps of generating by a well tool in a wellbore, output signals characteristic of a formation traversed by said wellbore:

receiving said output signals representative of a set of invasion parameters for each unit of depth in said wellbore;

for a given thickness at said each unit of depth in said wellbore, determining from said invasion parameters a volume of mud filtrate which has invaded into the permeable zones of said formation traversed by said wellbore, the determining step including the step of further determining said volume of mud filtrate which has invaded into the permeable zones of said formation traversed by said wellbore for a given thickness at said each unit of depth in said wellbore by using the following equation:

$$Vmf = 3.1416\ldots/3[(Rmf/Rxo)^{1/n}][r_1^2 + (r_1)(r_2) + r_2^2 - 3r_b^2],$$

where Vmf is the volume of mud filtrate, Rxo is a resistivity of a flushed zone in said formation, Rmf is the resistivity of said mud filtrate, $r_1$ is a radius measured from a wall of said wellbore to an outer radial extremity of said flushed zone, $r_2$ is a radius measured from a wall of said wellbore to an inner radial extremity of an uninvaded zone in said formation, and $r_b$ is a radius of said wellbore; and plotting the volume of mud filtrate invasion into the permeable zones of said formation for said each unit of depth on said output record medium.

4. The method of claim 3, wherein the plotting step comprises the step of:

displaying said Vmf representing the volume of mud filtrate invasion into said formation for said each unit of depth of said wellbore on a graph, a collection of said Vmf over a corresponding collection of depths in said wellbore representing said output record medium.

5. In a system including a well tool adapted to be disposed in a wellbore for generating output signals characteristic of a formation traversed by said wellbore and a surface apparatus adapted to be disposed at a surface of said wellbore and responsive to said output signals for generating an output record medium illustrating said characteristics of said formation, said surface apparatus including first means responsive to said output signals for generating invasion parameters associated with each unit of depth in said wellbore representative of a plurality of permeable zones in said formation and second means responsive to said invasion parameters for generating said output record medium illustrating a volume of mud filtrate invasion into said zones of said formation traversed by said wellbore, said second means comprising:

mud filtrate volume determination means responsive to said invasion parameters associated with said each unit of depth in said wellbore for determining a corresponding volume of mud filtrate which has invaded into said permeable zones of said formation for a given thickness at said each unit of depth in said wellbore, said permeable zones of said formation at each depth in said wellbore including a flushed zone, an uninvaded zone, and a transition zone interposed between said flushed zone and said uninvaded zone, said invasion parameters including a resistivity of the flushed zone (Rxo), a radius ($r_1$) measured from a wall of said wellbore to an outer radial extremity of said flushed zone, and a radius ($r_2$) measured from a wall of said wellbore to an inner radial extremity of said uninvaded zone, said mud filtrate volume determination means determining said volume of mud filtrate invasion into said flushed zone and said transition zone of said formation for a given thickness at said each unit of depth in said wellbore by using the following equation:

$$Vmf = 3.1416\ldots/3[(Rmf/Rxo)^{1/n}][r_1^2 + (r_1)(r_2) + r_2^2 3r_b^2],$$

where Vmf is the volume of mud filtrate, Rmf is the resistivity of said mud filtrate, and $r_b$ is the radius of said wellbore; and output record generating means responsive to the volume of mud filtrate invasion into said permeable zones of said formation for a given thickness at said each unit of depth in said wellbore determined by said mud filtrate volume determination means for generating an output record medium illustrating said volume of mud filtrate which has invaded into said permeable zones of said formation at a given thickness for said each unit of depth in the wellbore.

6. In the system of claim 5, wherein said output record generating means generates said output record medium, said output record medium illustrating said volume of mud filtrate "Vmf" which has invaded into the flushed zone and the transition zone of said formation for a given thickness at said each unit of depth in said wellbore in response to the determination of the volume of mud filtrate invasion Vmf into said flushed zone and said transition zone by said mud filtrate volume determination means.

7. In the system of claim 6, wherein said first means comprises:

borehole correction means responsive to said output signals for correcting said output signals to eliminate the effect of the presence of said wellbore and generating a set of corrected output signals;

signal processing means responsive to said set of corrected output signals from said borehole correction means for further processing said output signals thereby generating processed and corrected output signals; and parameterization means responsive to the processed and corrected output signals from said signal processing means for generating said invasion parameters associated with each unit of depth in said wellbore representative of said flushed zone, said transition zone, and said uninvaded zone in said formation traversed by said wellbore.

8. In a system including a well tool adapted to be disposed in a wellbore for generating output signals characteristic of a formation traversed by said wellbore and a surface apparatus adapted to be disposed at a surface of said wellbore and responsive to said output signals for generating an output record medium illustrating said characteristics of said formation, said surface apparatus including first means responsive to said output signals for generating invasion parameters associated with each unit of depth in said wellbore representative of a plurality of zones in said formation and second means responsive to said invasion parameters for generating said output record medium illustrating a volume of mud filtrate invasion into said zones of said formation traversed by said wellbore, a method practiced by said second means for generating said output record medium, comprising the steps of:

receiving in said second means said invasion parameters for each unit of depth in said wellbore;

for a given thickness at said each unit of depth in said wellbore, in response to said invasion parameters, determining a volume of mud filtrate which has invaded into said zones of said formation for a given thickness at said each unit of depth in said wellbore, the determining step including the step of further determining said volume of mud filtrate which has invaded the zones of said formation for a given thickness at said each unit of depth in said wellbore by using the following equation:

$$Vmf = 3.1416\ldots/3[(Rmf/Rxo)^{1/n}][r_1^2+(r_1)(r_2)+r_2^2-3r_b^2],$$

where Vmf is the volume of mud filtrate, Rxo is a resistivity of a flushed zone in said formation, Rmf is the resistivity of said mud filtrate, $r_1$ is a radius measured from a wall of said wellbore to an outer radial extremity of said flushed zone, $r_2$ is a radius measured from a wall of said wellbore to an inner radial extremity of an uninvaded zone in said formation, and $r_b$ is a radius of said wellbore; and plotting the volume of mud filtrate invasion in said zones of said formation on said output record medium.

9. A system for generating an output record medium illustrating a volume of mud filtrate invasion into permeable zones of a formation penetrated by a wellbore at each unit of depth in said wellbore, comprising:

first means for determining a corresponding volume of mud filtrate which has invaded into said permeable zones including a flushed zone, an uninvaded zone and a transition zone of said formation traversed by said wellbore for a given thickness at said each unit of depth in said wellbore in response to a set of invasion parameters, the invasion parameters including a resistivity of the flushed zone (Rxo), a radius ($r_1$) measured from a wall of said wellbore to an outer radial extremity of said flushed zone, and a radius ($r_2$) measured from a wall of said wellbore to an inner radial extremity of said uninvaded zone, said first means determining the volume of mud filtrate invasion into said flushed zone and said transition zone of said formation for a given thickness at said each unit of depth in said wellbore by using the following equation:

$$Vmf = 3.1416\ldots/3[(Rmf/Rxo)^{1/n}][r_1^2+(r_1)(r_2)+r_2^2-3r_b^2],$$

where Vmf is the volume of mud filtrate, Rmf is a resistivity of said mud filtrate, and $r_b$ is a radius of said wellbore; and output record generating means responsive to the volume of mud filtrate invasion determined by said first means for generating said output record medium illustrating said volume of mud filtrate invasion into said permeable zones of said formation at said each unit of depth in the wellbore.

10. A method of generating an output record medium illustrating a characteristic of a formation traversed by a wellbore, said formation having permeable zones, comprising the steps of generating by a well tool in a wellbore, output signals characteristic of a formation traversed by said wellbore;

receiving said output signals representative of a set of invasion parameters for each unit of depth in said wellbore;

for a given thickness at said each unit of depth in said wellbore, determining from said invasion parameters a volume of mud filtrate which has invaded into said permeable zones of said formation for a given thickness at said each unit of depth in said wellbore by using the following equation:

$$Vmf = 3.1416\ldots/3[(Rmf/Rxo)^{1/n}][r_1^2+(r_1)(r_2)+r_2^2-3r_b^2],$$

where Vmf is the volume of mud filtrate, Rxo is a resistivity of a flushed zone in said formation, Rmf is a resistivity of said mud filtrate, $r_1$ is a radius measured from a wall of said wellbore to an outer radial extremity of said flushed zone, $r_2$ is a radius measured from a wall of said wellbore to an inner radial extremity of an uninvaded zone in said formation, and $r_b$ is a radius of said wellbore; and plotting said volume of mud filtrate which has invaded into the permeable zones of said formation for said each unit of depth on said output record medium.

* * * * *